(12) United States Patent
Lee et al.

(10) Patent No.: US 8,038,449 B2
(45) Date of Patent: Oct. 18, 2011

(54) SYSTEM AND METHOD FOR GENERATING AN EXAM

(75) Inventors: Chung-I Lee, Taipei Hsien (TW); Hai-Hong Lin, Shenzhen (CN); De-Yi Xie, Shenzhen (CN); Chen-Chen Zhang, Shenzhen (CN); Xiao-Tie Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 694 days.

(21) Appl. No.: 12/176,425

(22) Filed: Jul. 21, 2008

(65) Prior Publication Data
US 2009/0087826 A1 Apr. 2, 2009

(30) Foreign Application Priority Data
Sep. 27, 2007 (CN) .......................... 2007 1 0201874

(51) Int. Cl.
*G09B 7/00* (2006.01)
(52) U.S. Cl. ........................................ 434/323; 434/350

(58) Field of Classification Search .................. 434/322, 434/323, 350, 112
See application file for complete search history.

(56) References Cited

U.S. PATENT DOCUMENTS
6,000,945 A * 12/1999 Sanchez-Lazer et al. .... 434/322
* cited by examiner

*Primary Examiner* — Xuan M. Thai
*Assistant Examiner* — Banafsheh Hadizonooz
(74) *Attorney, Agent, or Firm* — Frank R. Niranjan

(57) ABSTRACT

A method for generating an exam is disclosed. The method includes setting initial conditions for the exam, wherein the initial conditions comprises a number of true propositions p, a number of false propositions q, and a number of random propositions r, and determining numbers of different propositions in the exam according to the initial conditions. The method further includes selecting the p number of true propositions, and numbering each of the p number of true propositions with a running number, selecting q number of false propositions, grouping the q number of false propositions, numbering each of the groups with a group number, selecting the r number of propositions, grouping the r number of propositions, numbering each of the groups with a group number. The method further includes generating an exam according to the p number of true propositions, the q number of false propositions, and the r number of propositions.

10 Claims, 3 Drawing Sheets

SYSTEM AND METHOD FOR GENERATING AN EXAM

BACKGROUND OF THE INVENTION

1. Field of the Invention

Embodiments of the present disclosure relate to generating exams, and more particularly to a system and method for generating an exam.

2. Description of Related Art

An examination is often given to a person in order to determine a qualification or a grade for the person. The examination may be given on paper or be given electronically and may include true/false questions and/or multiple-choice questions. In order to generate the examination, a test creator often has to list out test questions and answers to the test questions manually.

However, this method is inefficient because listing out the test questions and the answers to the test questions is often redundant and exhausting. Additionally, the method often involves errors and accordingly extra resources may be employed to reduce the errors.

What is needed, therefore, is a system and method which can generate an exam automatically in order to reduce inefficiency and inaccuracy.

SUMMARY OF THE INVENTION

In one aspect, a computer-based method for generating a test paper is provided. The method includes: (a) setting a plurality of initial conditions for the exam, wherein the plurality of initial conditions comprises at least one of a number of true propositions p, a number of false propositions q, and a number of random propositions r; (b) c determining numbers of different propositions in the exam according to the plurality of initial conditions; (c) selecting the p number of true propositions from the database, saving the p number of true propositions in a first datasheet, and numbering each of the p number of true propositions with a running number, wherein the running number is a natural number beginning with the number 1; (d) selecting the q number of false propositions from the database, grouping the q number of false propositions, numbering each of the groups with a group number, wherein the running number is a natural number beginning with 1, and saving the grouped q number of false propositions in a second datasheet; (e) selecting r number of propositions from the database, grouping the r number of propositions, numbering each of the groups with a group number, and saving the grouped r number of propositions in a third datasheet; and (f) generating the exam according to the true propositions in the first datasheet and the running numbers of the true propositions, the false propositions in the second datasheet and the group numbers of the false propositions, and the propositions in the third datasheet and the group numbers of the propositions.

Other advantages and novel features will become more apparent from the following detailed description certain embodiments of the present disclosure when taken in conjunction with the accompanying drawings, in which:

DETAILED DESCRIPTION OF THE INVENTION

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer hardware.

Figure 1:
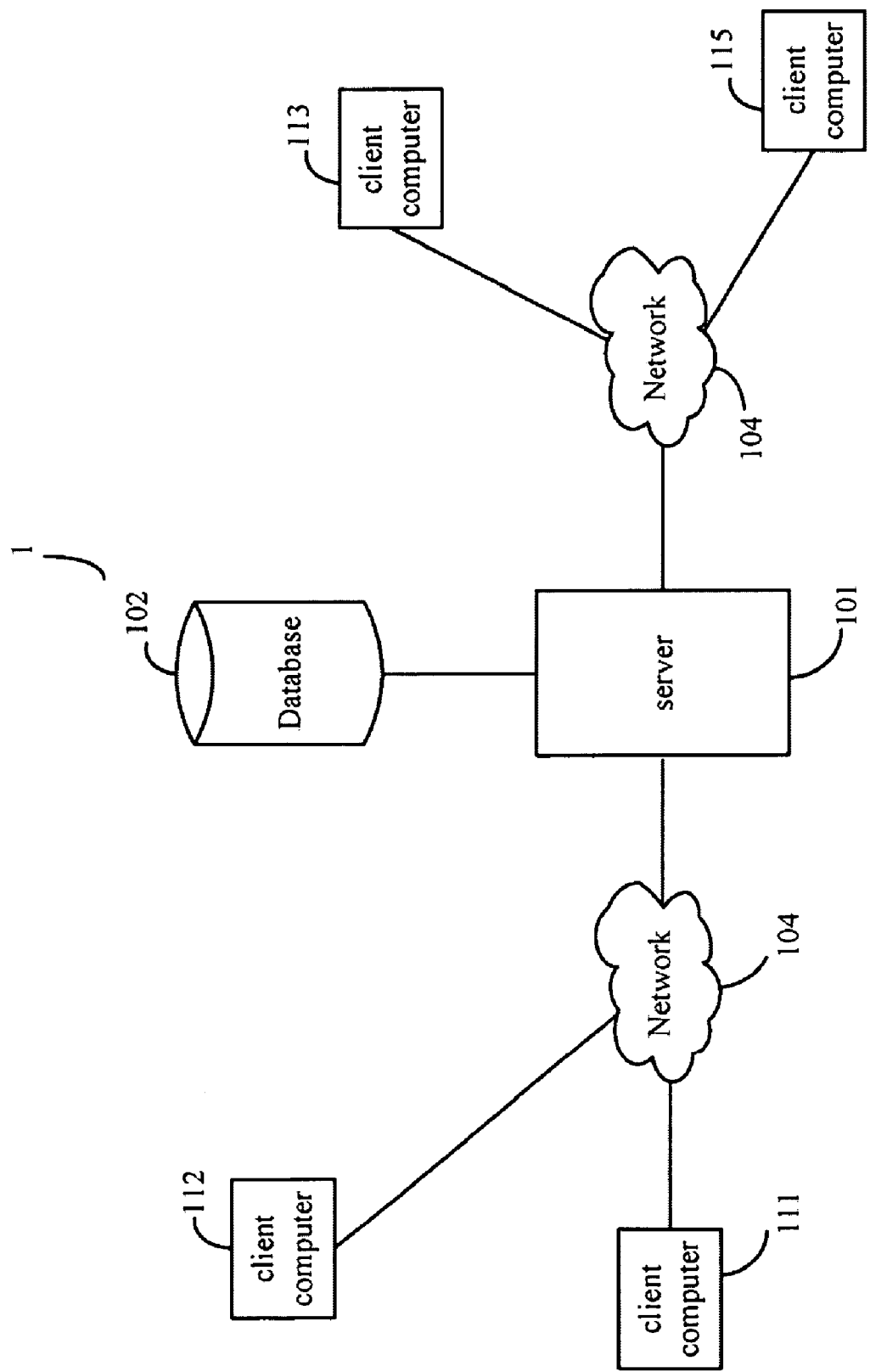
FIG. 1 is a schematic diagram of one embodiment of a system for generating an exam.

FIG. 1 is a schematic diagram of one embodiment of a system 1 for generating an examination (hereinafter, "exam"). The system 1 may be used to generate an exam to be printed out and to be taken manually, or the system 1 may be used to generate an exam that may be taken electronically. Further details of the generation of the exam will be further described below.

In one embodiment, the system 1 includes a server 101, a database 102, and one or more client computers. For the purpose of conveniently illustrating one embodiment of the present disclosure, four client computers 111, 112, 113, 115 are shown and described hereinafter. A network 104 interconnects all the above-mentioned apparatuses 101, 102, 111, 112, 113, 115.

Each of the client computers 111, 112, 113, 115 provides a graphical user interface (GUI) of the system. The GUI may be used to display various modules of the server 101 in order to generate the exam. Additionally, the GUI may be used by a user of one of the client computers 111, 112, 113, 115 in order to take an electronic version of the exam.

The network 104 is an electronic network, which may be the Internet, an intranet, or any other type of network. The network 104 may be used as a communication means for the client computers 111, 112, 113, 114, 115 to communicate with the server 101 and the database 102.

The database 102 stores information included in an exam, and is configured for processing the stored information, such as reading, writing, deleting, modifying, updating, and backing up the stored information. The information may include true propositions, false propositions, and related datasheets, for example.

The server 101 is configured for generating a paper or an electronic exam by utilizing the true propositions and the false propositions in the database 102. Additionally, the server 101 is configured for generating a paper or an electronic exam by utilizing one or more related information for multiple-choice questions.

Figure 2:
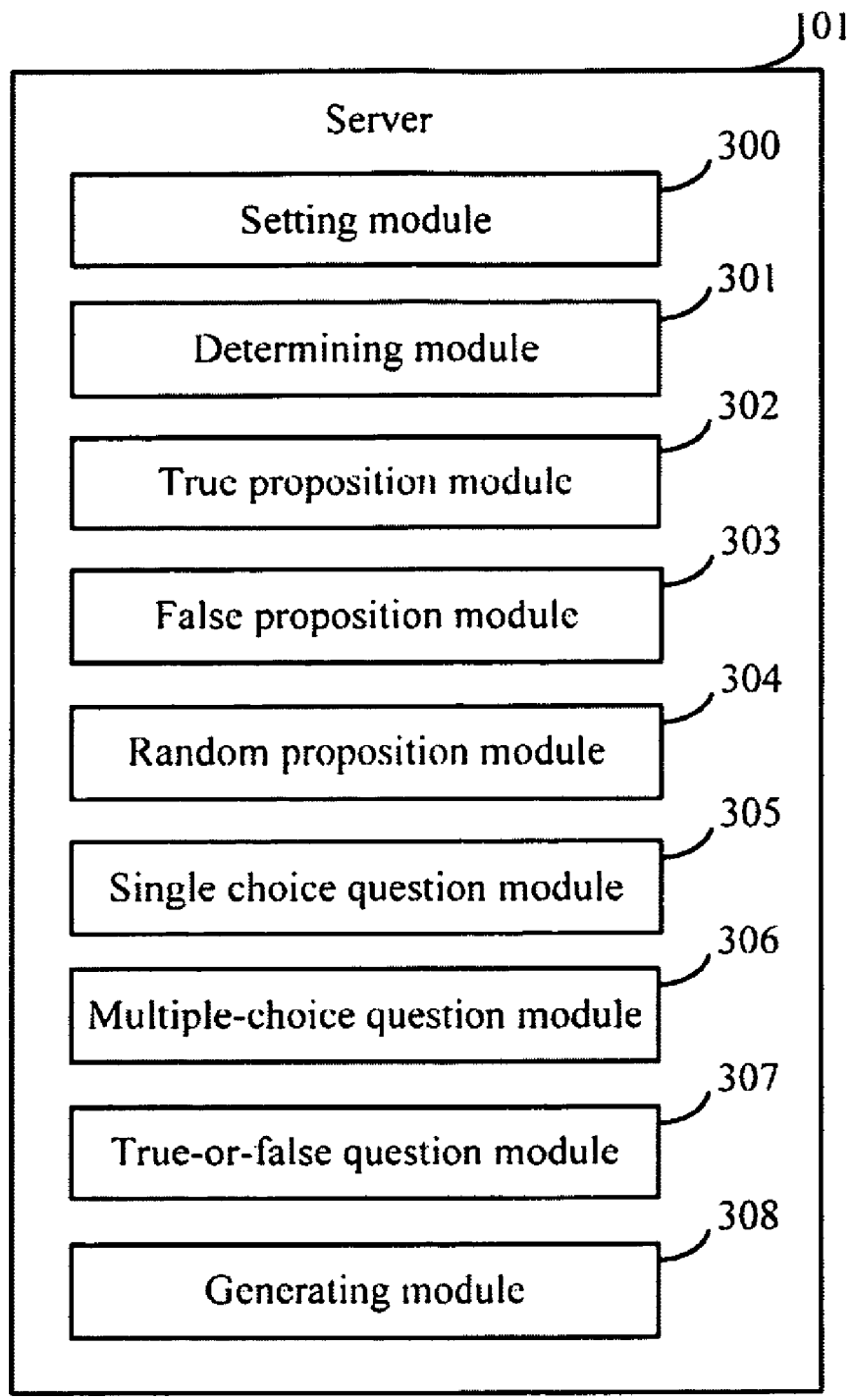
FIG. 2 is a block diagram showing one embodiment of function modules of a server in FIG. 1.

FIG. 2 is a block diagram of one embodiment of function modules of the server 101. The function modules may be used to implement certain functions and will be described in greater detail below. In one embodiment, the server 101 includes a setting module 300, a determining module 301, a true proposition module 302, a false proposition module 303, a random proposition module 304, a single choice question module 305, a multiple-choice question module 306, a true-or-false question module 307, and a generating module 308.

The setting module 300 is configured for setting initial conditions of an exam. Because an exam may have different kinds of questions, the initial conditions may include, for example, the number of single choice questions i, the number of multiple-choice questions j, the number of true propositions in true-or-false questions k, and the number of false propositions in the true-or-false questions m.

The determining module 301 is configured for determining numbers of different propositions according to the initial conditions. In detail, the determining module 301 confirms numbers of different propositions respectively according to i, j, k, and m, for example, the number of true propositions: p=i+j+k, the number of false propositions: q=i*3+m, and the number of random propositions: r=j*3.

The true proposition module 302 is configured for randomly selecting the p number of true propositions from the database 102, saving the p number of true propositions in a first datasheet (called "SingleRight1" hereinafter), and numbering each of the p number of true propositions with a running number. In one embodiment, the running number is a natural number, which may begin with the number 1.

The false proposition module 303 is configured for randomly selecting the q number of false propositions from the database 102, saving the q number of false propositions in a datasheet called SingleError1, and numbering each of the q number of false propositions with a running number which also may begin with the number 1.

The false proposition module 303 is also configured for grouping the q number of false propositions in the SingleError1 according to each running number. In one exemplary embodiment, the false proposition module 303 divides the q number of false propositions into a plurality of groups, each of which includes three false propositions. The false proposition module 303 is further configured for numbering each of the groups with a group number. Moreover, the false proposition module 303 is configured for saving the q number of false propositions groups in a second datasheet (called "SingleError2" hereinafter). The group number is a natural number, which also may begin with the number 1.

The random proposition module 304 is configured for selecting the r number of propositions from the database 102 randomly, saving the r number of propositions in a datasheet called Multi1, and numbering each of the r number of propositions with a running number.

The random proposition module 304 is also configured for grouping the r number of propositions in the Multi1 datasheet according to each running number. In one exemplary embodiment, the random proposition module 304 divides the r number of propositions into a plurality of groups, each of which includes three random propositions. The random proposition module 304 is further configured for numbering each of the groups with a group number. Moreover, the random proposition module 304 is configured for saving the r number of propositions groups in a third datasheet (called "Multi2" hereinafter).

The single choice question module 305 is configured for generating single choice questions according to the SingleRight1 and the SingleError2. In detail, firstly, the single choice question module 305 selects the true propositions each of which comprises a running number that is not greater than i from SingleRight1, and selects the groups of false propositions each of which comprises a group number that is not greater than i from SingleRight2. Next, the single choice question module 305 combines each selected true proposition and each selected group of false propositions having a group number which is the same as the running number of the selected true proposition, so as to generate single choice questions. Then, the single choice question module 305 saves the single choice questions in a datasheet called Single.

The multiple-choice question module 306 is configured for generating multiple-choice questions according to the SingleRight1 and the Multi2. In detail, firstly, the multiple-choice question module 306 selects all groups from the Multi2, and selects the j number true propositions from the singleRight1 in reverse order. Secondly, the multiple-choice question module 306 numbers each of the j number of true propositions with a serial number. In one embodiment, the serial number may be the running number of the true proposition—(p-j). Thirdly, the multiple-choice question module 306 combines each selected true proposition of the SingleRight1 and each selected group of the Multi2 having a group number which is the same as the serial number of the selected true proposition, so as to generate multiple-choice questions. Fourthly, the multiple-choice question module 306 saves the multiple-choice questions in a datasheet called Multi.

The true-or-false question module 307 is configured for generating true-or-false questions according to the SingleRight1 and the SingleError2. In detail, firstly, the true-or-false question module 307 selects the remaining true propositions from the SingleRight1, and selects the remaining groups of false propositions from the SingleError2. Then, the true-or-false question module 307 combines each selected true proposition of the SingleRight1 and each selected group of the SingleRight2 so as to generate true-or-false questions. Finally, the true-or-false question module 307 saves the true-or-false questions in a datasheet called YesOrNo (hereinafter, "YesOrNo").

The generating module 308 is configured for generating an exam according to the Single, the Multi and the YesOrNo. In detail, firstly, the generating module 308 adds a field "single choice questions" to the Single, adds a field "multiple-choice questions" to the Multi, and adds a field "true-or-false questions" to the YesOrNo. Then, the generating module 308 combines the Single, the Multi and the YesOrNo so as to generate the exam, and the generating module 308 saves the exam in the database 102.

Figure 3:
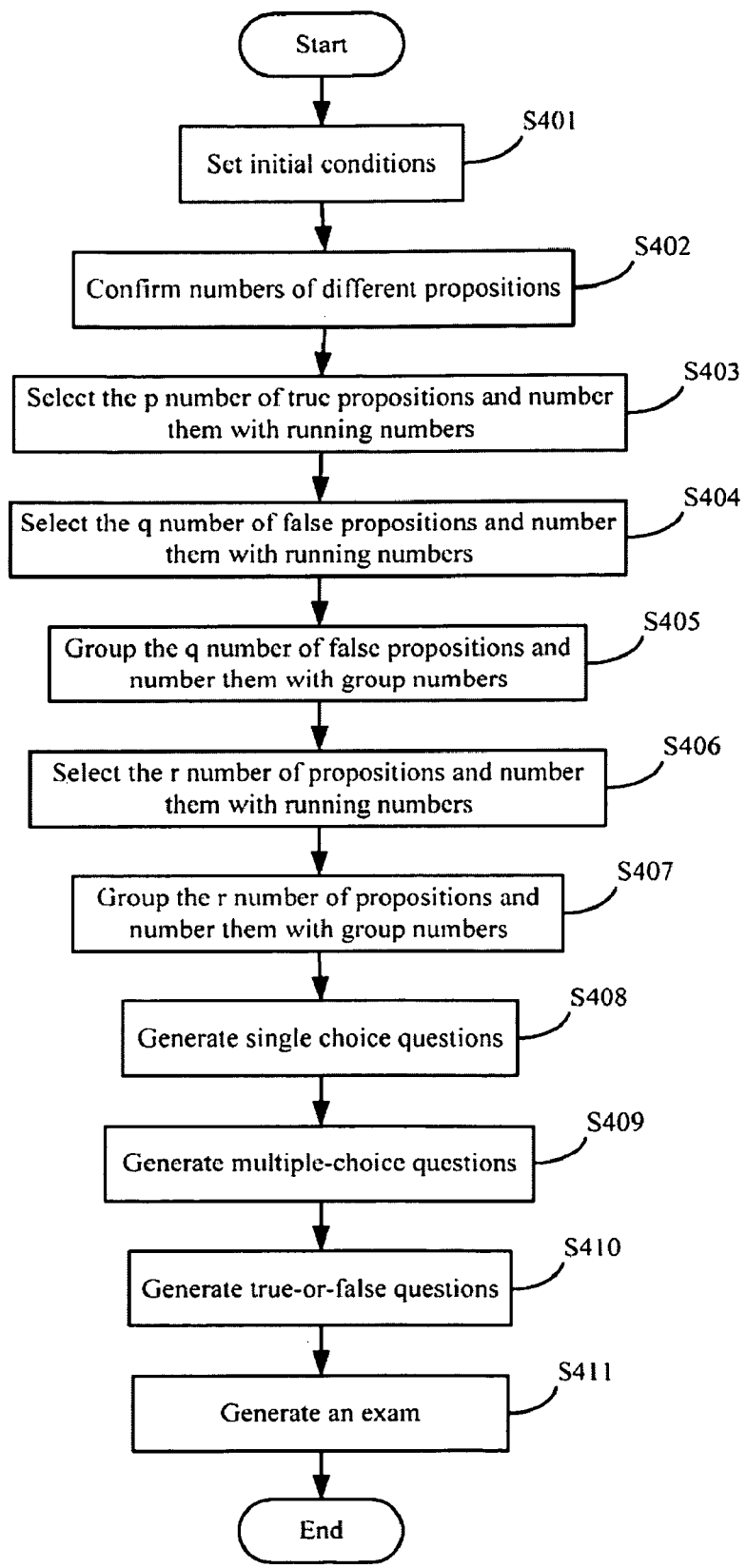
FIG. 3 is a flow chart of one embodiment of a method for generating an exam by utilizing the system of FIG. 1.

FIG. 3 is a flowchart of one embodiment of a method for generating an exam. Depending on the embodiment, additional blocks may be added, others removed, and the ordering of the blocks may be changed.

In step S401, the setting module 300 sets initial conditions of the exam. Because an exam may have different kinds of questions, the initial conditions may include, for example, the number of single choice questions i, the number of multiple-choice questions j, the number of true propositions in true-or-false questions k, and the number of false propositions in the true-or-false questions m.

In step S402, the determining module 301 confirms numbers of the different propositions according to the initial conditions. In detail, the determining module 301 confirms numbers of the different propositions respectively according to i, j, k, and m, for example, the number of true propositions: p=i+j+k, the number of false propositions: q=i*3+m, and the number of random propositions: r=j*3.

In step S403, the true proposition module 302 randomly selects the p number of true propositions from the database 102, saves the p number of true propositions in a first datasheet (called "SingleRight1" hereinafter), and numbers each of the p number of true propositions with a running number. In one embodiment, the running number is a natural number, which may begin with the number 1.

In step S404, the false proposition module 303 randomly selects the q number of false propositions from the database 102, saves the q number of false propositions in a datasheet called SingleError1, and numbers each of the q number false propositions with a running number which also may begin with the number 1.

In step S405, firstly, the false proposition module 303 groups the q number of false propositions in the SingleError1 according to each running number. In one exemplary embodiment, the false proposition module 303 divides the q number of false propositions into a plurality of groups, each of which includes three false propositions. Secondly, the false proposition module 303 numbers each of the groups with a group number. Thirdly, the false proposition module 303 saves the q number of false propositions groups in a second datasheet (called "SingleError2" hereinafter). The group number is a natural number, which also may begin with the number 1.

In step S406, the random proposition module 304 randomly selects the r number of propositions from the database 102, saves the r number of propositions in a datasheet called Multi1, and numbers each of the r number of propositions with a running number.

In step S407, firstly, the random proposition module 304 groups the r number of propositions in Multi1 datasheet according to each running number. In one exemplary embodiment, the random proposition module 304 divides the r number of propositions into a plurality of groups, each of which includes three random propositions. Secondly, the random proposition module 304 numbers each of the groups with a group number. Thirdly, the random proposition module 304 saves the r number of propositions groups in a third datasheet (called "Multi2" hereinafter).

In step S408, the single choice question module 305 generates single choice questions according to the SingleRight1 and the SingleError2. In detail, firstly, the single choice question module 305 selects the true propositions each of which comprises a running number that is not greater than i from SingleRight1, and selects the groups of false propositions each of which comprises a group number that is not greater than i from SingleRight2. Then, the single choice question module 305 combines each selected true proposition and each selected group of false propositions having a group number which is the same as the running number of the selected true proposition, so as to generate single choice questions. Finally, the single choice question module 305 saves the single choice questions in a datasheet called Single.

In step S409, the multiple-choice question module 306 generates multiple-choice questions according to the SingleRight1 and the Multi2. In detail, firstly, the multiple-choice question module 306 selects all groups from the Multi2, and selects the j number of true propositions from the singleRight1 in reverse order. Secondly, the multiple-choice question module 306 numbers each of the j number of true propositions with a serial number. Thirdly, the multiple-choice question module 306 combines each selected true proposition of the SingleRight1 and each selected group of the Multi2 having a group number which is the same as the serial number of the selected true proposition, so as to generate multiple-choice questions. Fourthly, the multiple-choice question module 306 saves the multiple-choice questions in a datasheet called Multi.

In step S410, the true-or-false question module 307 generates true-or-false questions according to the SingleRight1 and the SingleError2. In detail, firstly, the true-or-false question module 307 selects the remaining true propositions from the SingleRight1, and selects the remaining groups of false propositions from the SingleError2. Then, the true-or-false question module 307 combines each selected true proposition of the SingleRight1 and each selected group of the SingleRight2 so as to generate true-or-false questions. Finally, the true-or-false question module 307 saves the true-or-false questions in a datasheet called YesOrNo (hereinafter, "YesOrNo").

In step S411, the generating module 308 generates an exam according to the Single, the Multi, and the YesOrNo. In detail, firstly, the generating module 308 adds a field "single choice questions" to the Single, adds a field "multiple-choice questions" to the Multi, and adds a field "true-or-false questions" to the YesOrNo. Then, the generating module 308 combines the Single, the Multi and the YesOrNo so as to generate the exam, and the generating module 308 saves the exam in the database 102.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for generating an exam, the system storing a plurality of true propositions and false propositions in a database, the system comprising:
    a setting module configured for setting a plurality of initial conditions for the exam, wherein the plurality of initial conditions comprises a number of true propositions p, a number of false propositions q, and a number of random propositions r, wherein the number of true propositions p, the number of false propositions q, and the number of random propositions r are selected from the plurality of true and false propositions in the database;
    a determining module configured for determining numbers of different propositions in the exam according to the plurality of initial conditions; a true proposition module configured for selecting the p number of true propositions from the database, saving the p number of true propositions in a first datasheet, and numbering each of the p number of true propositions with a running number, wherein the running number is a natural number beginning with the number 1;
    a false proposition module configured for selecting the q number of false propositions from the database, grouping the q number of false propositions, numbering each of the groups with a group number, wherein the group number is a natural number beginning with 1, and saving the grouped q number of false propositions in a second datasheet;
    a random proposition module configured for selecting r number of propositions from the database, grouping the r number of propositions, numbering each of the groups with a group number, and saving the grouped r number of propositions in a third datasheet;
    a generating module configured for generating the exam according to the p number of true propositions in the first datasheet and the running numbers of the true propositions in the first datasheet, the q number of false propositions in the second datasheet and the group numbers of the false propositions in the second datasheet, the r number of propositions in the third datasheet and the group numbers of the propositions in the third datasheet.

2. The system according to claim 1, wherein the plurality of initial conditions comprises a number of single choice questions i, a number of multiple-choice questions j, a number of true propositions in true-or-false questions, and a number of false propositions in true-or-false questions.

3. The system according to claim 1, wherein the server further comprises a single choice question module configured for:
    selecting the true propositions each of which comprises a running number that is not greater than i from the first datasheet, and selecting the groups of false propositions each of which comprises a group number that is not greater than i from the second datasheet; and
    combining each selected true proposition and each selected group of false propositions having a group number which is the same as the running number of the true proposition, so as to generate single choice questions.

4. The system according to claim 2, wherein the server further comprises a multiple-choice question module configured for:

selecting the j number of true propositions from the first datasheet in reverse order, and numbering each of the j number of true propositions with a serial number, wherein the serial number is equal to a running number of the true proposition—(p-j); and combining each selected true proposition and each selected group of propositions in the third datasheet having a group number which is the same as the serial number of the selected true proposition so as to generate multiple-choice questions.

5. The system according to claim 4, wherein the server further comprises a true-or-false question module configured for:

selecting remaining true propositions from the first datasheet, and selecting remaining groups of false propositions from the second datasheet; and combining each selected true proposition and each selected group of false propositions so as to generate true-or-false questions.

6. A computer-based method for generating an exam, the method comprising:

setting a plurality of initial conditions for the exam, wherein the plurality of initial conditions comprises a number of true propositions p, a number of false propositions q, and a number of random propositions r, wherein the number of true propositions p, the number of false propositions q, and the number of random propositions r are stored in a database;

determining numbers of different propositions in the exam according to the plurality of initial conditions;

selecting the p number of true propositions from the database, saving the p number of true propositions in a first datasheet, and numbering each of the p number of true propositions with a running number, wherein the running number is a natural number beginning with the number 1;

selecting the q number of false propositions from the database, grouping the q number of false propositions, numbering each of the groups with a group number, wherein the group number is a natural number beginning with 1, and saving the grouped q number of false propositions in a second datasheet;

selecting r number of propositions from the database, grouping the r number of propositions, numbering each of the groups with a group number, and saving the grouped r number of propositions in a third datasheet; and generating the exam according to the p number of true propositions in the first datasheet and the running numbers of the true propositions in the first datasheet, the q number of false propositions in the second datasheet and the group numbers of the false propositions in the second datasheet, and the r number of propositions in the third datasheet and the group numbers of the propositions in the third datasheet.

7. The method according to claim 6, wherein the plurality of initial conditions comprises a number of single choice questions i, a number of multiple-choice questions j, a number of true propositions in true-or-false questions, and a number of false propositions in true-or-false questions.

8. The method according to claim 7, further comprising:

selecting the true propositions each of which comprises a running number that is not greater than i from the first datasheet, and selecting the groups of false propositions each of which comprises a group number that is not greater than i from the second datasheet;

combining each selected true proposition and each selected group of false propositions having a group number which is the same as the running number of the true proposition, so as to generate single choice questions.

9. The method according to claim 8, further comprising:

selecting the j number of true propositions from the first datasheet in reverse order, and numbering each of the j number of true propositions with a serial number, wherein the serial number is equal to a running number of the true proposition—(p-j); and combining each selected true proposition and each selected group of propositions in the third datasheet having a group number which is the same as the serial number of the selected true proposition so as to generate multiple-choice questions.

10. The method according to claim 9, further comprising:

selecting remaining true propositions from the first datasheet, and selecting remaining groups of false propositions from the second datasheet; and combining each selected true proposition and each selected group of false propositions so as to generate true-or-false questions.

* * * * *